United States Patent [19]
Hodson

[11] 3,837,666
[45] Sept. 24, 1974

[54] CONTAINER WHEEL ATTACHMENT
[76] Inventor: Beryl D. Hodson, 4801 Greenbrier Ave., San Diego, Calif. 92120
[22] Filed: Feb. 16, 1973
[21] Appl. No.: 333,165

[52] U.S. Cl. ............... 280/47.13 R, 280/79.2
[51] Int. Cl. ............................. B62b 1/12
[58] Field of Search........ 280/47.13 R, 47.26, 79.2; 248/129; 16/30

[56] References Cited
UNITED STATES PATENTS
1,045,013  11/1912  Fryberg..................... 16/30
2,953,387  9/1960  Portner................ 280/47.13 R FOREIGN PATENTS OR APPLICATIONS
339,189  12/1930  Great Britain.................. 16/30

Primary Examiner—David Schonberg
Assistant Examiner—John A. Pekar
Attorney, Agent, or Firm—Richard K. Macneill

[57] ABSTRACT

A container wheel attachment for attaching wheels to a container such as a standard metal trash can having a downwardly extending lip at the bottom portion thereof in which an arcuate U-shape bracket having an opening at the top portion thereof with a radius of curvature corresponding to the radius of curvature of the downward extending lip of a container for receiving the said lip and having a pair of wheels attached to one surface of the bracket, the bracket being attached to the lip by a plurality of attachment screws resulting in a wheel attachment with the bottom surface of the wheels substantially coplanar with the bottom surface of the downwardly extending lip of the container.

1 Claim, 5 Drawing Figures

PATENTED SEP 24 1974 3,837,666

CONTAINER WHEEL ATTACHMENT

BRIEF DESCRIPTION OF THE INVENTION

The present invention relates to a container wheel attachment and more particularly to a container wheel attachment for attachment to a downwardly extending lip of a container.

According to the invention, a container wheel attachment is provided in which a pair of small wheels are each rotatably coupled to a pair of wheel brackets which in turn are fixedly attached as by welding to an arcuate bracket assembly. The arcuate bracket assembly has a U-shaped cross section opening at the top portion thereof and dimensioned for receiving an arcuate downwardly extending lip of a container such as a standard metallic trash can. The arcuate bracket assembly is attached to the lip as by a plurality of machine screws or bolts. The bottom surfaces of the wheels after attachment are preferably coplanar the bottom surface of the downwardly extending lip to alleviate any stress on the wheel bracket assembly except when wheeling the container. When it is desired to move the container, the opposite side of the container from the wheel assembly is simply lifted, raising the bottom surface of the downwardly extending lip off the surface on which it rests and allowing the entire assembly to be carried by the wheels.

An object of the present invention is the provision of an improved container wheel attachment.

A further object of the invention is the provision of a container wheel attachment which can be attached to standard containers.

Another object of the invention is the provision of a container wheel attachment with superior load distribution characteristics.

Yet another object of the invention is the provision of a container wheel attachment which is inexpensive to manufacture and convenient in use and installation.

Other objects and many of the attendant advantages of the present invention will be readily appreciated as the same becomes better understood by reference to the following detailed description when considered in connection with the accompanying drawings in which like reference numerals designate like parts throughout the Figures thereof and wherein.

DETAILED DESCRIPTION OF THE DRAWING

Figure 3:
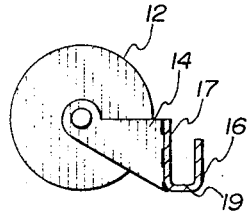
FIG. 3 is a sectional view taken along lines 3 — 3 of FIG. 1.
Figure 1:
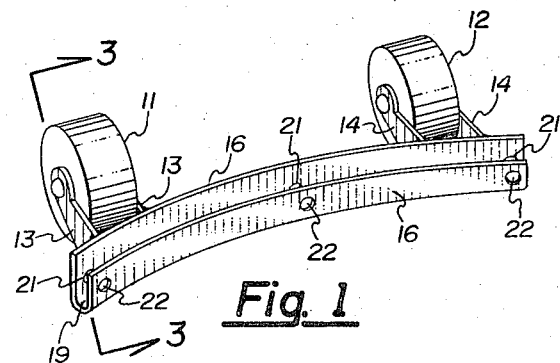
FIG. 1 is a perspective view of the preferred embodiment of the present invention.
Figure 2:
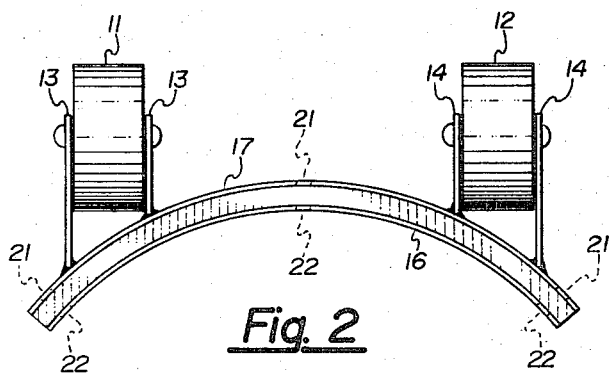
FIG. 2 is a top view of the embodiment of FIG. 1.

Referring to FIGS. 1, 2 and 3, wheels 11 and 12 are rotatably coupled to brackets 13 and 14, respectively, which in turn are welded to arcuate U-shaped bracket 16. Arcuate U-shaped bracket 16 has a front leg 17 (FIG. 2) and a bottom section 19. Mounting holes 21 are in alignment with mounting holes 22.

Figure 4:
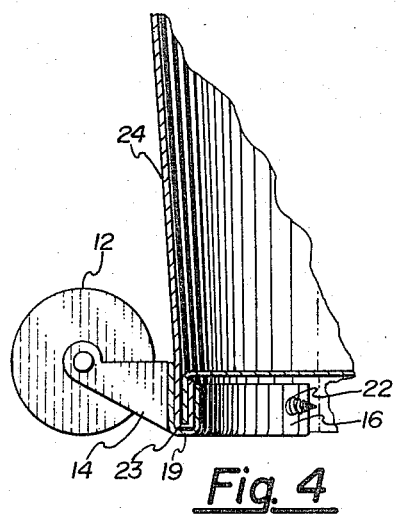
FIG. 4 is a side elevation view of the embodiment of FIG. 1 in situ.

Referring to FIG. 4, wheel 11 is again shown rotatably coupled to bracket 12 which, in turn, is welded to arcuate U-shaped bracket assembly 16. The top opening of U-shaped bracket 16 receives downwardly extending lip 23 of container 24.

Figure 5:
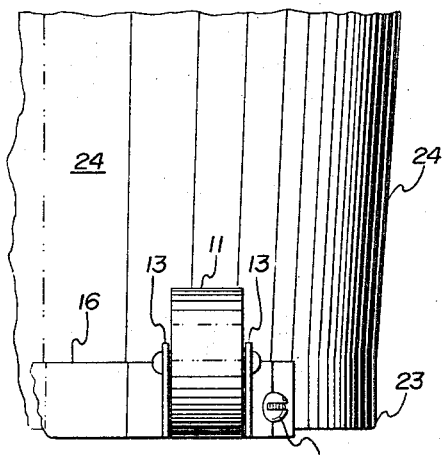
FIG. 5 is an end view of the embodiment of FIG. 1 in situ.

Referring to FIG. 5, wheel 11 is shown rotatably attached to bracket 13 which is welded to arcuate U-shaped bracket assembly 16. Arcuate U-shaped bracket assembly 16 is attached to container 24 by mounting screw 26.

Referring back to all of the Figures, it can be seen that if the bracket assembly shown in FIGS. 1 and 2 is prefabricated with an arch in bracket 16, it has the same radius of curvature as the downwardly extending lip 23 of a circular container 24 such as a standard metal trash can. The arcuate bracket 16 will receive lip 23 after which a plurality of screws or bolts 26 can pass through mounting holes 21 and 22 together with the holes added to lip 23, resulting in a solid addendum to metal container 24. It is pointed out that through the use of arcuate bracket 16 the load distribution extends across a significant segment of the downwardly extending lip 23. As pointed out above, it is desirable to have the bottom surface at wheels 11 and 12 substantially coplanar with the bottom surface of downwardly extending lip 23 of container 24 to reduce stress on the bracket assembly during periods when the wheels are not in use.

It should be understood, of course, that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A container wheel attachment for attaching wheels to a cylindrical container of the type having a downwardly extending lip from the bottom portion thereof comprising:

an arcuate U-shaped bracket having a radius of curvature and being dimensioned for receiving a downwardly extending lip from a cylindrical container;

first and second U-shaped brackets fixedly attached to a leg of said arcuate bracket, said first and second U-shaped brackets being disposed in parallel relationship with each other; and first and second wheels rotatably carried by said first and second U-shaped brackets, respectively.

* * * * *